United States Patent Office 3,472,785
Patented Oct. 14, 1969

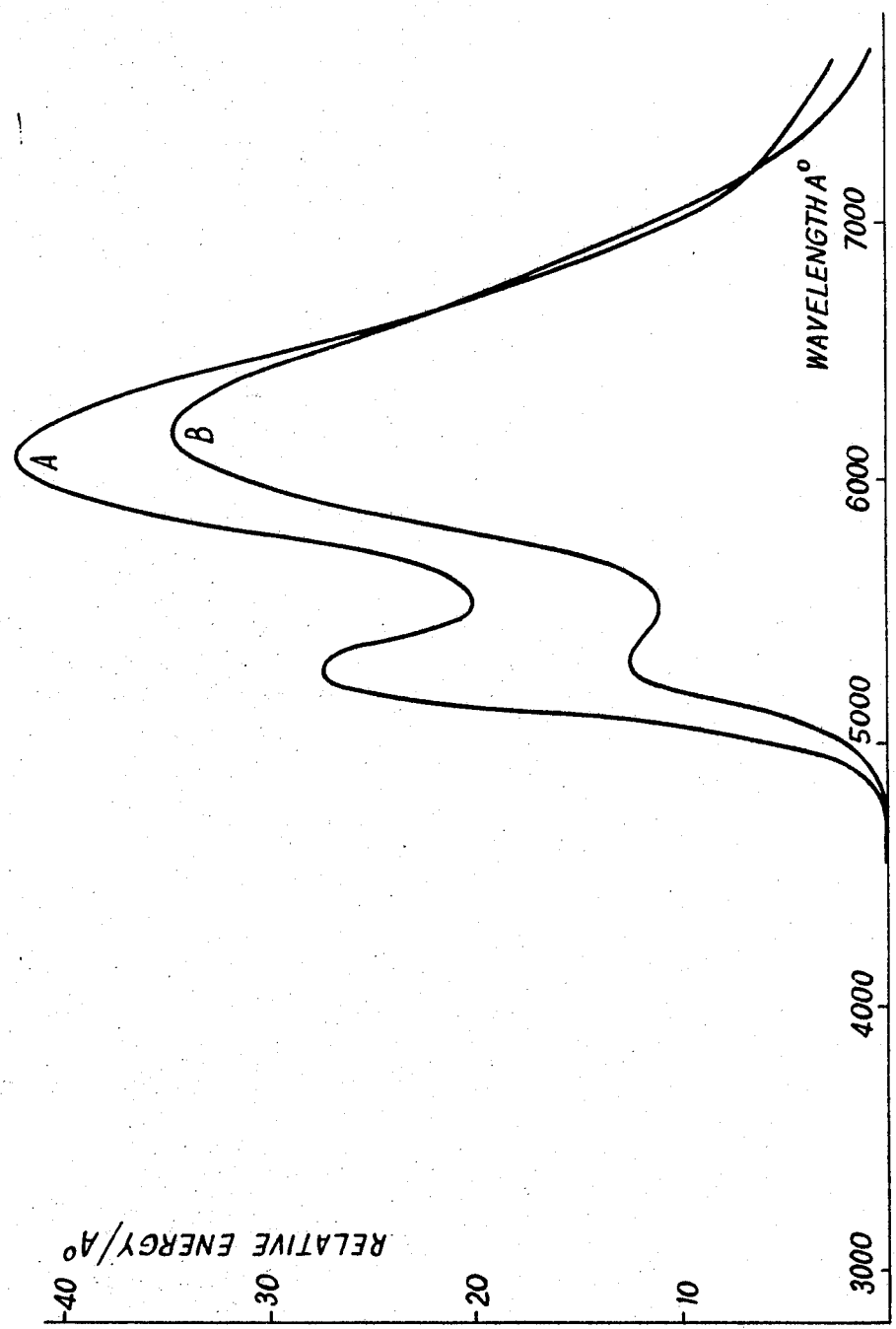

3,472,785
MANGANESE ACTIVATED ALKALINE EARTH ZINC SILICO-HALOPHOSPHATE LUMINESCENT MATERIAL
Peter Whitten Ranby and David Richard Palowkar, London, England, assignors to British Lighting Industries Limited, London, England
Filed Apr. 28, 1966, Ser. No. 546,043
Claims priority, application Great Britain, Apr. 28, 1965, 17,922/65
Int. Cl. C09k 1/36
U.S. Cl. 252—301.6
8 Claims

ABSTRACT OF THE DISCLOSURE

An alkaline earth metal zinc silico-halophosphate activated by manganese fluoresces in a continuous series from green through yellow and pink to a reddish color depending on the relative amounts of silicate to halophosphate. The phosphors are responsive to short wavelength ultraviolet radiation and to a lesser extent to long wave ultraviolet radiation and cathode rays. The phosphors find utility in fluorescent lamps.

---

The present invention relates to luminescent materials and a method for the production of such materials.

Synthetic willemite (zinc silicate) is well known as a valuable luminescent material, having a green fluorescence. Also well known are the alkaline earth metal halophosphate luminescent materials, in which the host crystal has the apatite structure and contains an activating metal, such as antimony, arsenic, bismuth, cerium or silver. Where one such "primary activator" is present in a halophosphate, manganese can also be included, and a further range of materials obtained. Manganese alone, however, does not function is an activator for apatite halophosphates.

It has now been found that if a halophosphate type of material containing manganese is formed in the presence of, or at the same time as, zinc silicate, a new series of luminescent materials is produced having luminescent characteristics somewhat resembling those of mixtures of willemite and manganese-containing apatites. It should, however, be noted that the new materials are entirely distinct from such mixtures, this being particularly demonstrated by the fact that no activating metal other than manganese is required for the halophosphate. In a mere mixture, the absence of a "primary activator" would result in an absence of luminescene of the halophosphate component.

According to the invention there are thus provided alkaline earth metal zinc silico-halophosphate luminescent materials activated by manganese. The composition of the new materials can be varied widely and neither the zinc silicate nor the halophosphate portions of the material need be stoichiometric. The preferred alkaline earth metals are calcium or strontium or a mixture thereof. In the halophosphate, the halogen is preferably fluorine or chlorine or both.

The more valuable materials according to the invention are prepared from an initial mixture of ingredients containing the zinc silicate components in a proportion of at least 10% and not more than 80% by weight of the initial mixture. If less than 10% of zinc silicate components are used, the luminescent brightness of the final phosphor is very low and the brightest materials are obtained when the zinc silicate components comprise 20% more of the initial mixture. If more than 80% by weight of the initial mixture are zinc silicate components, then the final phosphor has essentially the luminescent properties (for example, the colour) of the well known willemite form of zinc silicate phosphor. The brightest phosphors, with luminescent emissions different from that of willemite, are obtained when the zinc silicate components comprise 65% or less by weight of the initial mixture, and accordingly the preferred amount of zinc silicate components between 20 and 65% by weight of the mixture.

Luminescent materials are obtained over a wide range of manganese concentration. The preferred lower limit for manganese is 0.002 atom Mn per atom (Zn+Ca+Sr) and the higher limit is 0.4 atom Mn per atom (Zn+Ca+Sr), while the most effective range of manganese concentrations is 0.005–0.25 atom Mn per atom (Zn+Ca+Sr).

Depending on their composition, the new materials show X-ray diffraction patterns characteristic of willemite or apatite, or both, but the absence of the hitherto essential "primary activator" sets them apart from conventional luminescent materials of apatite structure.

The new materials provide a range of emission colours extending in a continuous series from green (characteristic of willemite) through yellow and pink to a reddish colour. They are responsive to short wavelength ultra-violet radiation (for example, 2537A.) and can be used in the manufacture of fluorescent lamps. To a lesser extent, they are also excited by long wavelength ultra-violet and cathode rays.

The change in spectral energy distribution of the fluorescent emission with increasing concentration of manganese is shown by the curves illustrated in the accompanying drawings, where curve A shows the energy distribution of the emission of a sample as prepared in Example 1 below, and curve B that from a sample as prepared in Example 2, having a greater concentration of manganese.

The invention also provides a new method for the preparation of luminescent materials, which method comprises mixing together ingredients which on heating will form an alkaline earth metal halophosphate, a compound of manganese, and zinc silicate or ingredients which on heating will form zinc silicate, and heating the mixture under such conditions that a luminescent product is obtained. It is to be noted that it is not necessary that any group of ingredients should be present in stoichiometric proportions.

The brightest luminescence is obtained when the mixture is heated in an atmosphere of steam at temperatures between 750 and 1200° C., more especially from 900 to 1100° C. In the preferred procedure, the mixture is fired to a temperature of from 900 to 1100° C. in a closed vessel, cooled, ground and re-heated to a temperature within the same range in an atmosphere of steam.

The ingredients for the halophosphate portion of the mixture may include an alkaline earth metal phosphate and a carbonate or halide, and ammonium chloride, and the manganese may be present as, for example, a halide such as manganese chloride and/or fluoride or other compound, such as carbonate or phosphate. The zinc silicate portion may be represented by ingredients such as zinc oxide and silica.

Because of the wide range of possible compositions and the lack of a single distinctive X-ray diffraction pattern, it is not possible to characterise the new materials more narrowly than in the foregoing description. A number of specific examples of materials embodying the invention will now be described to indicate to those skilled in the art how the invention may be performed.

EXAMPLE 1

| | G. |
|---|---|
| $SrHPO_4$ | 36.6 |
| $SrCO_3$ | 14.7 |
| $ZnO$ | 16.2 |
| $SiO_2$ | 6.0 |
| $MnCl_2 4H_2O$ | 6.93 |
| $NH_4Cl$ | 6.95 |

These materials were ground together and then fired for 2 hours in a closed silica crucible at 1000° C. When cool, the material was ground to a fine powder and re-heated for a further half hour at 1000° C. in an atmosphere of steam. When cool, the product shows a pinkish coloured fluorescene under shortwave ultra-violet, with a peak at 6100 A and a secondary peak at 5300 A.

EXAMPLE 2

If the method of Example 1 is modified by omitting the $SrCO_3$, increasing the amount of ZnO to 24.3 g., increasing the amount of $MnCl_2 4H_2O$ to 12.87 g. and reducing the amount of $NH_4Cl$ to 3.75 g. then the product shows an organge fluorescence, with peaks at substantially the same wavelengths as in Example 1, but with an increase in the relative energy at wavelengths less than about 6100 A.

EXAMPLE 3

If the method of Example 2 is modified by using 12 g. $SiO_2$ then the product shows a green fluorescence.

EXAMPLE 4

Mixtures as given in the following table were prepared and heated as in the previous examples. The colour of the fluorescence of the product is shown at the foot of the table.

| | Mixture A | Mixture B | Mixture C |
|---|---|---|---|
| Grams: | | | |
| $CaHPO_4$ | 50.0 | 50.0 | 50.0 |
| $CaCO_3$ | 11.5 | 7.0 | 10.0 |
| $CaF_2$ | 7.0 | 6.2 | 3.5 |
| $ZnO$ | 28.0 | 28.0 | 28.0 |
| $SiO$ | 9.0 | 9.0 | 9.0 |
| $MnCl_2 4H_2O$ | 5.94 | 16.83 | 17.82 |
| $NH_4Cl$ | 5.0 | 3.8 | 7.0 |
| Colour of Flourescence | Green | Yellow | Pink |

EXAMPLE 5

| | G. |
|---|---|
| $SrHPO_4$ | 36.6 |
| $ZnO$ | 24.3 |
| $SiO_2$ | 6.0 |
| $MnCl_2 4H_2O$ | 8.91 |
| $MnF_2$ | 1.86 |
| $NH_4Cl$ | 3.75 |

These materials were ground together and then fired for 1 hour in a closed silica crucible at 900° C. When cool, the material was ground to a fine powder and re-heated for 1 hour in steam at 900° C. When cool, the product shows a pink fluorescence when excited by short wavelength ultra-violet (2537 A).

EXAMPLE 6

| | G. |
|---|---|
| $SrHPO_4$ | 36.6 |
| $ZnO$ | 24.3 |
| $SiO_2$ | 6.0 |
| $MnCl_2 4H_2O$ | 4.95 |
| $MnF_2$ | 3.72 |
| $NH_4Cl$ | 3.75 |

This and the following samples were treated as in Example 5, except for the temperature of heating in Examples 10–15. The product shows a green fluorescence under the same short wave excitation as in Example 5.

EXAMPLE 7

| | G. |
|---|---|
| $SrHPO_4$ | 36.6 |
| $ZnO$ | 24.3 |
| $SiO_2$ | 6.0 |
| $MnCl_2 4H_2O$ | 7.5 |
| $NH_4Cl$ | 8.0 |

The product shows a yellow fluorescence.

EXAMPLE 8

| | G. |
|---|---|
| $SrHPO_4$ | 36.6 |
| $SrCO_3$ | 10.29 |
| $ZnO$ | 16.2 |
| $MnCl_2 4H_2O$ | 5.95 |
| $SiO_2$ | 6.0 |
| $NH_4Cl$ | 4.05 |

The product shows a yellow fluorescence.

EXAMPLE 9

| | G. |
|---|---|
| $CaHPO_4$ | 27.2 |
| $ZnO$ | 24.3 |
| $SiO_2$ | 6.0 |
| $MnCl_2 4H_2O$ | 15.0 |
| $NH_4Cl$ | 4.05 |

The product shows a yellow fluorescence.

EXAMPLE 10

| | G. |
|---|---|
| $CaHPO_4$ | 50.0 |
| $CaCO_3$ | 13.0 |
| $CaF_2$ | 3.9 |
| $ZnO$ | 28.0 |
| $NH_4Cl$ | 10.3 |
| $MnCl_2 4H_2O$ | 10.89 |
| $SiO_2$ | 9.0 |

This sample and all the following samples were fired at 1100° C. The product shows a yellow-green fluorescence.

EXAMPLE 11

| | G. |
|---|---|
| $CaHPO_4$ | 50.0 |
| $CaCO_3$ | 13.0 |
| $CaF_2$ | 1.2 |
| $ZnO$ | 28.0 |
| $NH_4Cl$ | 10.3 |
| $MnCl_2 4H_2O$ | 17.82 |
| $SiO_2$ | 9.0 |

The product shows an orange fluorescence.

EXAMPLE 12

| | G. |
|---|---|
| $CaHPO_4$ | 50.0 |
| $CaCO_3$ | 11.0 |
| $CaF_2$ | 1.17 |
| $MnCl_2 4H_2O$ | 16.83 |
| $ZnO$ | 27.2 |
| $SiO_2$ | 9.0 |
| $NH_4Cl$ | 4.28 |

The product shows a yellow fluorescence.

EXAMPLE 13

| | G. |
|---|---|
| $SrHPO_4$ | 63.7 |
| $SrCO_3$ | 16.2 |
| $ZnO$ | 27.2 |
| $SrF_2$ | 8.75 |
| $MnCl_2 4H_2O$ | 5.94 |
| $SiO_2$ | 9.0 |
| $NH_4Cl$ | 4.28 |

The product shows a green fluorescence.

EXAMPLE 14

| | G. |
|---|---|
| $CaHPO_4$ | 50.0 |
| $SrCO_3$ | 16.2 |
| $SrF_2$ | 3.75 |
| ZnO | 27.2 |
| $SiO_2$ | 9.0 |
| $MnCl_2 4H_2O$ | 13.86 |
| $NH_4Cl$ | 4.28 |

The product shows a yellow fluorescence.

A material prepared according to this example, when used in 4-foot, 40 watt fluorescent lamps gave an initial brightness of 42 lumens per watt with colour coordinates of $x=0.374$, $y=0.473$.

EXAMPLE 15

| | G. |
|---|---|
| $CaHPO_4$ | 50.0 |
| $SrCO_3$ | 16.2 |
| $SrF_2$ | 1.87 |
| ZnO | 27.2 |
| $SiO_2$ | 9.0 |
| $MnCl_2 4H_2O$ | 16.83 |
| $NH_4Cl$ | 4.28 |

The product shows an orange fluorescence.

A material prepared according to this example, when used in 4-foot, 40 watt fluorescent lamps gave an initial brightness of 31 lumens per watt with colour coordinates of $x=0.416$, $y=0.449$.

We claim.

1. A solid solution forming a zinc silico-haloorthophosphate phosphor containing calcium and/or strontium in the matrix and activated by manganese in luminescent activating proportions, the zinc silicate portion of the solution being between about 10 and 80 weight percent of the composition.

2. A method of making a luminescent material comprising the steps of mixing together calcium and/or strontium haloorthophosphate or materials which form calcium and/or strontium haloorthophosphate plus zinc silicate and/or materials which form zinc silicate, the mixture containing between about 10 and 80 weight percent of zinc silicate or materials which form zinc silicate and the balance haloorthophosphate, further including in said mixture a compound of manganese in activating proportions; heating said mixture until a luminescent product is obtained and then cooling said product.

3. A method according to claim 2 in which the halophosphate ingredients contain a compound of at least one of calcium and strontium.

4. A method according to claim 2 in which the said mixture contains from 0.002 to 0.4 gram atom of manganese per gram atom in sum of zinc, calcium and strontium.

5. A method according to claim 2 in which the mixture contains an alkaline earth metal phosphate, an alkaline earth metal carbonate and an ammonium halide.

6. A method according to claim 2 in which the mixture contains zinc oxide and silica.

7. A method according to claim 2 in which the mixture contains a manganese halide.

8. A method according to claim 2 including the steps of:
   initially heating said mixture to a temperature within the range of 900–1100° C. in a closed vessel;
   cooling and grinding the heated material; and
   subsequently heating the ground material to a temperature within the range of 900–1100° C. in an atmosphere of steam.

References Cited

UNITED STATES PATENTS

| 2,717,244 | 9/1955 | Zalm et al. |
| 2,772,241 | 11/1956 | Ranby et al. |

FOREIGN PATENTS

| 782,994 | 4/1968 | Canada. |

TOBIAS E. LEVOW, Primary Examiner.

R. D. EDMONDS, Assistant Examiner.